(12) United States Patent
Takasan et al.

(10) Patent No.: US 6,609,609 B2
(45) Date of Patent: Aug. 26, 2003

(54) OBJECT LEVITATING APPARATUS AND METHOD FOR CONTROLLING THE SAME

(75) Inventors: Masaki Takasan, Kariya (JP);
Yoshikazu Koike, Yokohama (JP);
Sadayuki Ueha, Machida (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 115 days.

(21) Appl. No.: 09/956,319

(22) Filed: Sep. 19, 2001

(65) Prior Publication Data

US 2002/0054812 A1 May 9, 2002

(30) Foreign Application Priority Data

Sep. 20, 2000 (JP) ........................................ 2000-285605

(51) Int. Cl.[7] .............................................. B65G 27/32
(52) U.S. Cl. .................... 198/630; 198/752.1; 310/321; 310/323
(58) Field of Search ............................ 181/0.5; 198/630, 198/752.1, 760, 763, 766, 767, 769; 310/321, 323

(56) References Cited

U.S. PATENT DOCUMENTS

| 5,810,155 | A | * | 9/1998 | Hashimoto et al. .......... 198/630 |
| 2002/0088693 | A1 | * | 7/2002 | Takasan et al. ........... 198/752.1 |
| 2003/0034228 | A1 | * | 2/2003 | Takasan et al. ........... 198/752.1 |

FOREIGN PATENT DOCUMENTS

| JP | 7-024415 | 1/1995 | ............. B06B/1/02 |
| JP | 7-137824 | 5/1995 | ............ B65G/27/24 |
| JP | 9-202425 | 8/1997 | ............ B65G/27/24 |

* cited by examiner

Primary Examiner—Janice L. Krizek
(74) Attorney, Agent, or Firm—Morgan & Finnegan, LLP

(57) ABSTRACT

A method of controlling an object levitating apparatus is disclosed. The levitating apparatus levitates an object on a plurality of vibrating bodies with air pressure generated from sound waves produced by the vibrating bodies. Each vibrating body is vibrated by a corresponding vibrating apparatus. Each vibrating apparatus has an oscillator and a transducer. The transducer is actuated by the oscillator to vibrate the corresponding vibrating body. The method includes determining impedance of each transducer, and controlling each oscillator in accordance with the determined impedance to restrict displacement of the levitated object.

17 Claims, 3 Drawing Sheets

OBJECT LEVITATING APPARATUS AND METHOD FOR CONTROLLING THE SAME

BACKGROUND OF THE INVENTION

The present invention relates to an object levitating apparatus, which levitates an object with air pressure generated from sound waves, and a method for controlling the apparatus.

Japanese Unexamined Patent Publications No. 7-24415, No. 7-137824, and No. 9-202425 each disclose an object levitating apparatus for levitating an object on a vibrating body with air pressure generated from sound waves produced by the vibrating body, which is vibrated by a vibrating means. The vibrating body used in each apparatus is plate-like. The surface of the object facing the vibrating body is flat. Object levitating apparatuses that move levitated objects by blasting air or by producing traveling waves with a vibrating body have also been disclosed.

The object levitating apparatus may be installed on a carriage to transfer an object in a levitated state.

If an object is plate-like and has a large surface area, it is preferred that a plurality of vibrating plates be used to stably levitate the object. However, when longitudinal vibrations are produced in the vibrating plates, the force for holding the objects in a predetermined position is insufficient. Therefore, the object is displaced even by a small lateral force. A vibratory device is provided for each vibrating body. If the vibrating force differs between vibrating bodies, the object will be horizontally displaced with respect to the vibrating bodies. In the object levitating apparatus that holds an object in a levitated state, the object may fall off the apparatus if the object is left in a displaced state. In an apparatus that moves an object in a levitated state with travelling waves produced by the elongated vibrating bodies, the object may meander or fall.

Therefore, a guide or a restricting member is necessary to restrict the horizontal movement of the object. However, in an apparatus for carrying an object while levitating the object by the elongated vibrating body, a large-scale guide is necessary, which increases manufacturing costs. Also, in an object levitating apparatus that holds an object in a levitated state, the guide obstructs the transfer of the object from the object levitating device.

Japanese Unexamined Patent Publication 9-202425 discloses an object levitating apparatus provided with a photosensor, which detects a levitated object approaching an end of a carrying path of the apparatus. Based on a detection signal from the sensor, the apparatus stops moving the object or shifts the carrying direction. However, it is necessary that many sensors be arranged along the long carrying path to detect the position of the object and prevent the object from moving out of the carrying path.

SUMMARY OF THE INVENTION

Accordingly, it is an object of the present invention to provide an object levitating apparatus that holds an object in a predetermined position without a guide, a restricting member, or many sensors, and a method for controlling the object levitating apparatus.

To attain the above object, the present invention provides a method of controlling, an object levitating apparatus for levitating an object on a plurality of vibrating bodies with air pressure generated from sound waves produced by the vibrating bodies. Each vibrating body is vibrated by a corresponding vibrating apparatus. Each vibrating apparatus has a oscillator and a transducer. The transducer is actuated by the oscillator to vibrate the corresponding vibrating body. The method includes determining impedance of each transducer, and controlling each oscillator in accordance with the determined impedance to restrict displacement of the levitated object.

The present invention also provides a method of controlling, an object levitating apparatus for levitating an object on a plurality of vibrating bodies with air pressure generated from sound waves produced by the vibrating bodies. Each vibrating body is vibrated by a corresponding vibrating apparatus. Each vibrating apparatus has an oscillator and a transducer. The transducer is actuated by the oscillator to vibrate the corresponding vibrating body. The method includes determining impedance of each transducer, and controlling the position of each vibrating body in accordance with the determined impedance to restrict displacement of the levitating object.

The present invention also provides a levitating apparatus for levitating an object on a plurality of vibrating bodies with air pressure generated from sound waves produced by the vibrating bodies. The apparatus comprises a vibrating apparatus for vibrating each vibrating body. Each vibrating apparatus has an oscillator and a transducer. The transducer is actuated by the oscillator to vibrate the corresponding vibrating body. A detector detects the impedance of the transducer. A controller controls each oscillator in accordance with the impedance detected by the detector to restrict displacement of the levitating object.

The present invention also provides an apparatus for levitating an object on a plurality of vibrating bodies with air pressure generated by sound waves produced by the vibrating bodies. The apparatus comprises a vibrating apparatus for vibrating each vibrating body. Each vibrating apparatus has an oscillator and a transducer. The transducer is actuated by the oscillator to vibrate the corresponding vibrating body. An elevating means raises or lowers the vibrating bodies. A detector detects the impedance of the transducer. A controller controls the elevating means to change the position of each vibrating body in accordance with the impedance detected by the detector.

Other aspects and advantages of the invention will become apparent from the following description, taken in conjunction with the accompanying drawings, illustrating by way of example of the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

A first embodiment according to the present invention will now be described with reference to FIGS. 1 to 4.

Figure 1:
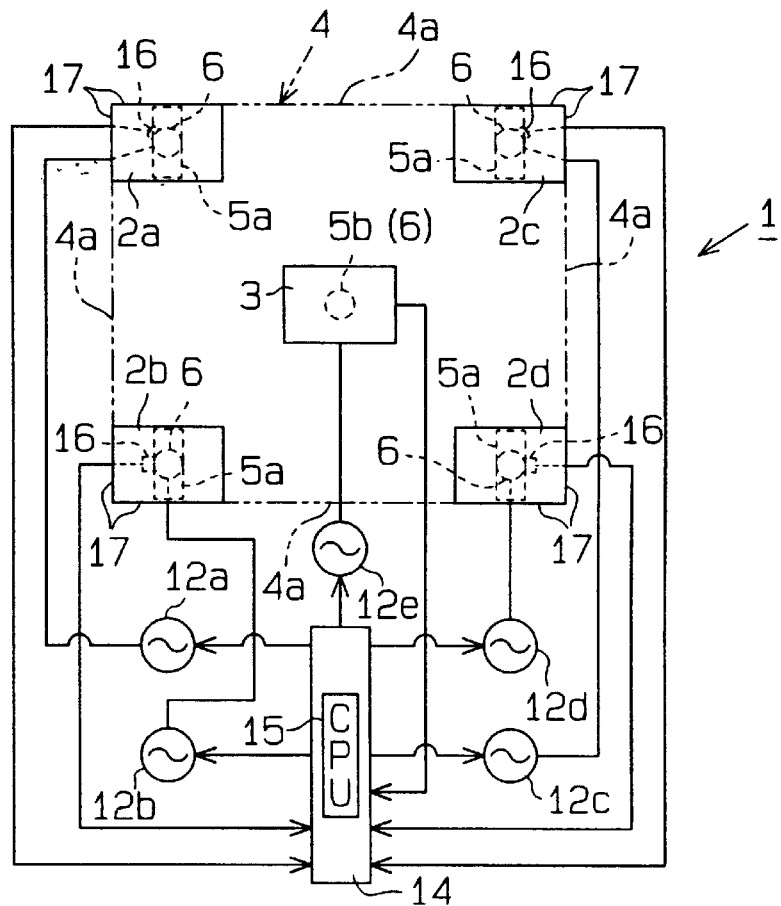
FIG. 1 is a plan view of an object levitating apparatus according to a first embodiment of the present invention.
Figure 4:
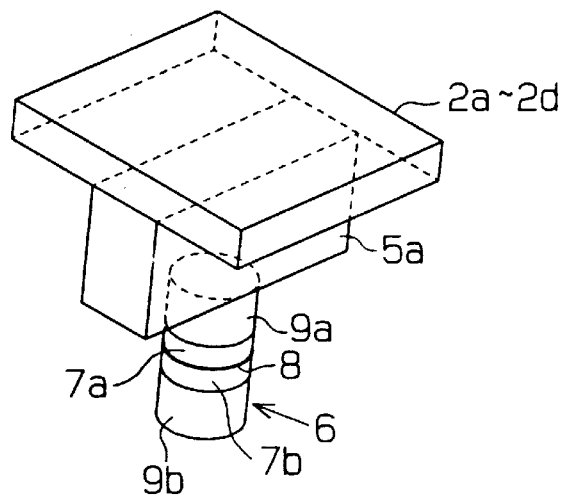
FIG. 4 is a perspective view of each vibrating body and each transducer.

FIG. 1 shows an object levitating apparatus 1 including a plurality of rectangular vibrating bodies. Specifically, they are vibrating bodies 2a, 2b, 2c, and 2d and a vibrating body 3. The vibrating bodies 2a to 2d, 3 have the same dimensions. The vibrating bodies 2a to 2d are located in positions corresponding to corners of a rectangular object 4 (outlined by double-dotted line). The vibrating body 3 is located the same distance away from each of the four vibrating bodies 2a to 2d. Horns 5a, which serve as vibrating means, are fastened to the vibrating bodies 2a, 2b, 2c and 2d, respectively, with screws. A horn 5b, which serves as another vibrating means, is fastened to the vibrating body 3 with a screw. As shown in FIG. 4, the horns 5a fixed to the associated vibrating bodies 2a to 2d are rectangular. The horns 5a are fixed approximately to the middles of the associated vibrating bodies 2a to 2d. The horn 5b is generally cylindrical and fixed approximately to the middle of the vibrating body 3.

Figure 3:
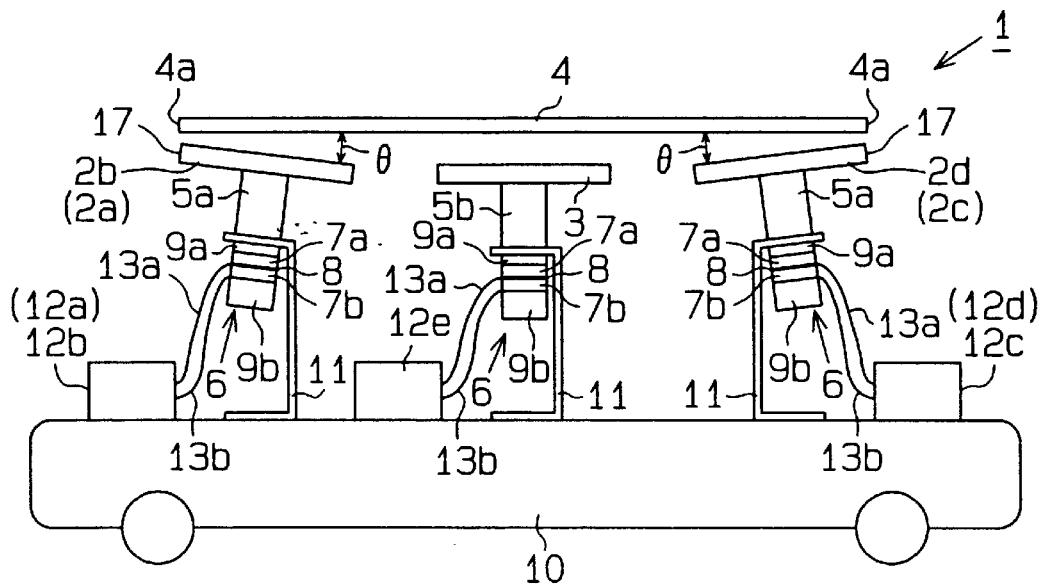
FIG. 3 is a front view of an object levitating apparatus installed on a carrier.

As shown in FIG. 3, the inner vibrating body 3 is positioned such that the upper surface of the inner vibrating body 3 is horizontal. Two of the outer vibrating bodies 2a, 2c are aligned in a longitudinal direction of the object 4. Similarly, another two of the outer vibrating bodies 2b, 2d are aligned longitudinally. The upper, flat surface of each of the outer vibrating bodies 2a, 2b, 2c, and 2d is inclined as shown at angle θ with respect to a horizontal bottom surface of the object 4. The vibrating bodies 2a to 2d are arranged so that the forces acting on the object 4 are balanced. The appropriate angle θ between each of the vibrating bodies 2a to 2d and the bottom surface is determined according to the mass of the object 4, the areas of the vibrating bodies 2a to 2d, and other factors. The angle θ is approximately 1° and normally less than or equal to 3°

The vibrating bodies 2a to 2d, 3 are fixed to the top surfaces of the associated horns 5a, 5b as described above. The bottom surfaces of the outer horns 5a are respectively fixed to transducers 6. Likewise, the bottom surface of the inner horn 5b is fixed to a transducer 6. The top surfaces of the outer horns 5a are perpendicular to the axes of the corresponding transducers 6. Likewise, the top surface of the horn 5b is perpendicular to the axis of the corresponding transducer 6. Each of the axes of the transducers 6 corresponding to the outer horns 5a is inclined at the angle θ with respect to a vertical line.

Langevin transducers serve as the transducers. Each transducer 6 includes a pair of annular piezoelectric elements 7a, 7b, an annular electrode plate 8, and metal blocks 9a, 9b. Each electrode plate 8 is arranged between the corresponding piezoelectric elements 7a, 7b. In each transducer 6, the metal blocks 9a, 9b contact the upper end of the piezoelectric elements 7a and the lower end of the piezoelectric element 7b, respectively. The piezoelectric elements 7a, 7b, the electrode plate 8, and the metal blocks 9a, 9b are fixed together with a bolt, not shown. The bolt extends from the lower metal block 9b to the upper metal block 9a, which is provided with a threaded hole, not shown. The metal blocks 9a, 9b are electrically connected by the bolt.

The object levitating apparatus 1 is installed on a carrier 10, or a carriage, with support brackets 11. The transducers 6 that correspond to the outer vibrating bodies 2a to 2d are fixed to the support brackets 11 at the angle θ as shown. The transducer 6 that corresponds to the inner vibrating body 3 is fixed to the support bracket 11 at a right angle, as shown.

As shown in FIGS. 1 and 3, the outer transducers 6, which vibrate the outer vibrating bodies 2a to 2d, are connected to associated outer oscillators 12a to 12d. Likewise, the inner transducer 6, which vibrates the inner vibrating body 3, is connected to an oscillator 12e. As shown in FIG. 3, the electrode plates 8 are connected to the associated oscillators 12a to 12e by wiring 13a. Terminals of the oscillators 12a to 12e are connected to the associated metal blocks 9b by wiring 13b. In the present embodiment, vibrating means, which vibrate the associated vibrating bodies 2a to 2d, 3 include the associated horns 5a, 5b, transducers 6, and oscillators 12a to 12e.

The oscillators 12a to 12e are driven in response to control signals from a controller 14. The controller 14 includes a CPU 15, which serves as a judging means and a control means. The transducers 6 are respectively equipped with impedance detectors 16, shown in FIG. 1, for detecting the impedances of the associated vibratory systems that vibrate the associated vibrating bodies 2a to 2d, 3. The impedance detectors 16 are connected to the CPU 15 via an A/D converter and an interface, neither of which is not shown.

The controller 14 includes a memory, not shown. The memory stores for each transducer 6 a map or an expression representing relationship between impedance and displacement. Based on a detection signal from the impedance detector 16, the CPU 15 judges whether the object 4 is displaced or not. When judging that the object 4 is displaced from a predetermined range, the CPU 15 controls at least either frequency or voltage of each of the oscillators 12a to 12e to correct the displacement.

The operation of the object levitating apparatus 1 having the above-described structure will now be discussed.

The object levitating apparatus 1, which holds the object 4 in a levitated state, is carried to a predetermined position by the carrier 10.

As shown in FIGS. 1 and 3, the object 4 is placed on the outer vibrating bodies 2a to 2d, 3 such that edges 4a of the object 4 coincide with outer edges 17 of the outer vibrating bodies 2a to 2d. In this condition, the transducers 6 are oscillated at predetermined resonance frequencies (approximately 20 kHz) by driving the associated oscillators 12a to 12e. Vertical vibrations of the horns 5a, 5b cause flexural vibrations of the vibrating bodies 2a to 2d, 3. Sound waves (standing waves) are generated by the flexural vibrations of the vibrating bodies 2a to 2d, 3. The object 4 is levitated from the vibrating bodies 2a to 2d, 3 by the air pressures caused by the sound waves emanating from the vibrating bodies 2a to 2d, 3.

Air pressure is applied to the object 4 from the inclined vibrating bodies 2a, 2b, 2c, and 2d, and the force of the air pressure of each vibrating body 2a, 2b, 2c, 2d includes vertical component and a horizontal component. While the horizontal component forces are opposed and balanced, the object 4 is levitated. The levitating height is 10 to 1000 μm.

When one of the edges 4a of the object 4 moves outside of vertical boundaries defined by the corresponding outer edges 17 of the vibrating bodies 2a to 2d, the object 4 is re-centered or repositioned by the forces of the sound waves from the vibrating bodies 2a to 2d. Accordingly, the object 4 is stably held in the predetermined position.

Figure 2:
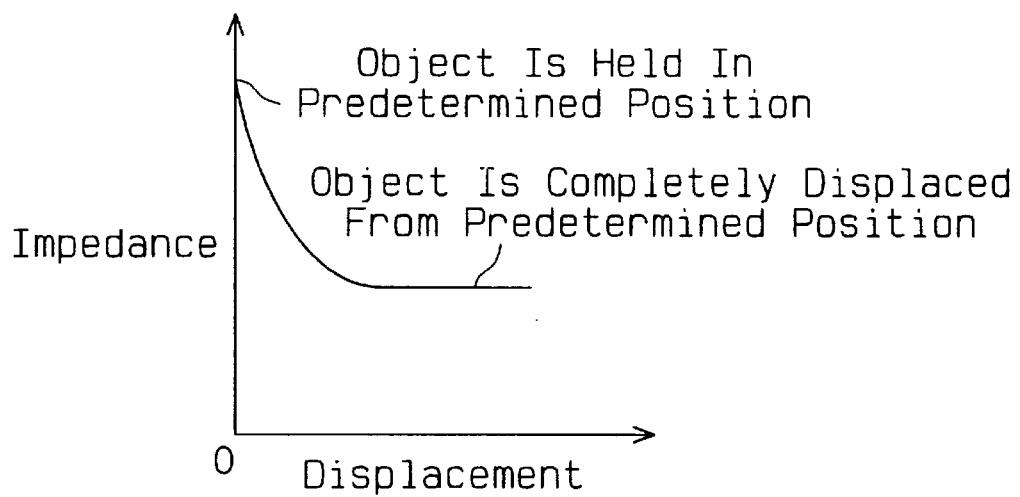
FIG. 2 is a graph showing a relationship between impedance of each transducer and an amount of displacement.

The impedances that are detected when the transducers 6 are oscillated at the predetermined resonance frequencies vary according to whether the object 4 is present or absent. The impedances also vary according to the displacement of the object 4. As shown in FIG. 2, the impedance is the highest when the object is held in the predetermined position. The impedance decreases as displacement of the object from the predetermined position increases. When the object is completely moved out of the predetermined position, the impedance becomes constant.

Based on a detection signal from each impedance detector 16, the CPU 15 judges whether the object 4 is displaced from the predetermined position or not. When judging that the object 4 is displaced from the position, the CPU 15 sends a signal to each of the oscillators 12a to 12e to alter at least its frequency or voltage to correct the displacement. The CPU 15 controls the pressures produced by the vibrating bodies 2a to 2d, 3 with respect to the object 4 such that the force applied to the object 4 in the direction of the displacement is reduced. Thus, the object 4 is moved in the direction opposite to the direction of the displacement. Controlling at least the frequency or the voltage of each of the oscillators 12a to 12e by the CPU 15 alters the air pressures and prevents the displacement from increasing. This corrects the displacement of the object 4 and holds the object 4 in the predetermined position.

Advantages of the present embodiment will now be described.

Based on a change in the impedance of each of the vibratory systems, which vibrate the associated vibrating bodies 2a to 2d, 3, the CPU 15 judges whether or not the object 4 is displaced from the predetermined position. Therefore, sensors for directly detecting the position of the object 4 are unnecessary, and the detection of the amount of the displacement of the object 4 is relatively simple.

Controlling at least the frequency or voltage of each of the oscillators 12a to 12e corrects the displacement of the object 4. This makes it possible to hold the object 4 in a levitated state in a predetermined range without providing a guide or a restricting member.

Since the vibrating bodies 2a to 2d, 3 are vibrated to generate standing waves, the structure of the object levitating apparatus 1 according to the present embodiment is simple in comparison to that of an object levitating apparatus that generates travelling waves.

The object levitating apparatus 1 is installed on the carrier 10. Therefore, the object 4 can securely be carried to the predetermined position in a levitated state as the carrier 10 is moved.

The outer vibrating bodies 2a to 2d are inclined at the angle θ to the horizontal plane. This allows the object 4 to be held more reliably in the predetermined position, as compared to a device where the vibrating bodies 2a to 2d are horizontal.

The bottom surface of the object 4 is flat, and the edges 4a of the object 4 are straight. When the outer vibrating bodies 2a to 2d levitate the object 4, the outer edges 17 of outer the vibrating bodies 2a to 2d are vertically aligned with the corresponding edges 4a of the object 4. This enables the object 4 to be stabilized in the predetermined position.

A second embodiment of the present invention will now be discussed with reference to FIG. 5. The second embodiment is the same as the first embodiment shown in FIGS. 1 to 4, except that each of the vibrating bodies 2a to 2d can be raised/lowered by an elevating means and that displacement of the object 4 is corrected by controlling the heights of the vibrating bodies 2a to 2d, 3.

To avoid redundancy, like or same reference numerals are given to those components that are the same as the corresponding components of the first embodiment.

Support brackets 11 are fixed to rods 18a of the associated actuators 18, which serve as the elevating means. Electric cylinders or linear actuators, which can be controlled by electric signals, are used as the actuators 18. Based on a detection signal from each of the impedance detectors 16, the CPU 15 judges whether or not the object 4 is displaced from the predetermined position. When judging that the object 4 is displaced from the predetermined position, the CPU 15 sends a signal to each actuator 18 to correct the displacement. Consequently, the heights of the vibrating bodies 2a to 2d, 3 are altered.

Even if the vibrating bodies 2a to 2d, 3 are the same in vibration frequency and amplitude, the forces applied to the object 4 are varied by altering the distances between the object 4 and the vibrating bodies 2a to 2d, 3. Therefore, altering the heights of the vibrating bodies 2a to 2d, 3 adjusts the forces applied to the object 4 by the vibrating bodies 2a to 2d, 3. Accordingly, the object 4 is held in the predetermined position.

Therefore, in the object levitating apparatus 1 of the second embodiment, an extra sensor is unnecessary and the structure of the apparatus 1 is simplified. In addition, the object levitating apparatus 1 of FIG. 5 has the following advantages.

When the object 4 is displaced from the predetermined position, the CPU 15 controls the actuators 18 to adjust the heights of the vibrating bodies 2a to 2d. This allows the object 4 to be inclined from the horizontal position and moved by its own weight. Therefore, correction of the displacement is easier in comparison to the first embodiment.

A third embodiment according to the present invention will now be discussed with reference to FIG. 6. The third embodiment is the same as the first embodiment shown in FIGS. 1 to 4 and the second embodiment shown in FIG. 5, except that an object levitating apparatus 19 holds the object 4 in a levitated state at a predetermined height and that the object 4 is moved in the longitudinal directions of vibrating bodies 20a, 20b. Each of the vibrating bodies according to the third embodiment generates a travelling wave, which travels in one direction.

To avoid redundancy, like or same reference numerals are given to those components that are the same as the corresponding components of the first and second embodiments.

Figure 6:
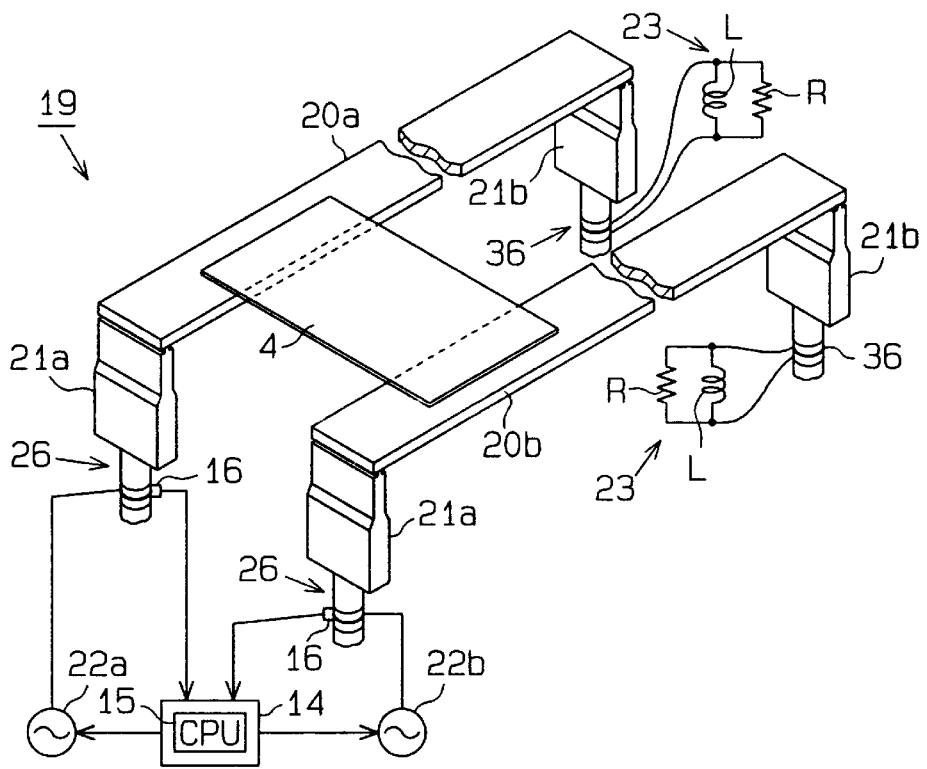
FIG. 6 is a perspective view of an object levitating apparatus according to a third embodiment of the present invention.

The object levitating apparatus (object carrying apparatus) 19 of FIG. 6 includes a plurality of vibrating bodies 20a, 20b, which are parallel. A first horn 21a is fixed to one end of the vibrating body 20a and another first horn 21a is fixed to one end of the vibrating body 20b. Two transducers 26 are respectively connected to the first horns 21a to vibrate the respective first horns 21a. The first transducers 26 are connected to associated oscillators 22a, 22b. The oscillators 22a, 22b are connected to the controller 14. Similarly, a second horn 21b is connected to the other end of the vibrating body 20a and another second horn 21b is connected to the other end of the vibrating body 20b. Second transducers 36 are respectively connected to the second horns 21b to vibrate the respective second horns 21b. The second transducers 36 are respectively connected to load circuits 23, or energy conversion means. Each load circuit 23 includes a resistor R and a coil L.

When the first transducers 26 are oscillated, flexural vibration is caused in the vibrating bodies 20a, 20b by the corresponding horns 21a, 21b. Consequently, the object 4 is levitated from the vibrating bodies 20a, 20b. The vibrations of the vibrating bodies 20a, 20b are transmitted to the associated second transducers 36 connected to the associated load circuits 23. Then, the energy of the vibrations, or mechanical energy, is converted into electrical energy by the piezoelectric elements 7a, 7b. The electrical energy is converted into Joule heat by the resistors R of the load circuits 23 and released. Consequently, waves of the vibrations generated in the vibrating bodies 20a, 20b are turned into travelling waves, which travel in one direction. As a result, the object 4 is conveyed in a levitated state from the first transducers 26 toward the transducers 36. The conveyance of the object 4 is stopped by turning off the oscillators 22a, 22b.

If the pressures of the sound waves generated by the vibrating bodies 20a, 20b become unbalanced, which causes a difference in propelling force between the vibrating bodies 20a, 20b, the object 4 is displaced in the lateral direction of the vibrating bodies 20a, 20b. Based on detection signals from the impedance detectors 16, the CPU 15 judges whether or not the object 4 is laterally displaced. When judging that the object 4 is laterally displaced from the predetermined central position, the CPU 15 instructs each of the oscillators 22a, 22b to alter at least frequency or voltage to correct the displacement. In other words, an imbalance of the pressure of the vibrating bodies 20a, 20b is eliminated to correct the displacement of the object 4. Accordingly, this prevents the object 4 from meandering.

The object levitating apparatus 19 moves the levitated object 4 along vibrating bodies 20a, 20b by generating traveling waves. This makes it possible to carry the object 4 while preventing the object 4 from meandering without providing a guide, a restricting member, and many sensors.

The present embodiments are not limited to the details described above but may be embodied in the following forms.

Figure 5:
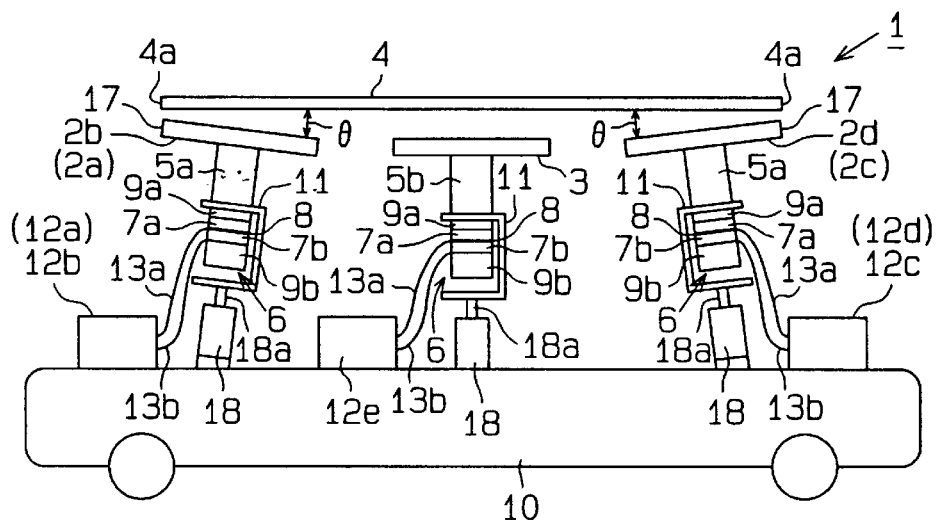
FIG. 5 is a front view of an object levitating apparatus according to a second embodiment of the present invention.

In the object levitating apparatus 1 of the second embodiment, which is shown in FIG. 5, the displaced object 4 is brought back to the predetermined position in the levitated state by altering the heights of the vibrating bodies 2a to 2d, 3 by the actuation of the associated actuators 18, which serve as the elevating means. When the displacement of the object 4 is small, the displacement may be reversed by altering the frequencies or voltages of the oscillators 12a to 12e instead of using the actuators 18. However, the actuators 18 enable the displaced object 4 to be moved back to the predetermined position more quickly in comparison to moving it back to the position by the alteration of the frequencies and voltages of the oscillators 12a to 12e.

In the object levitating apparatus 19 shown in FIG. 6, another vibrating body may be arranged between and parallel to the vibrating bodies 20a, 20b when the object 4 is wide. In this case, the vibrating bodies do not have to generate traveling waves but may generate standing waves. This restricts flexure of the object 4 caused by its own weight. Accordingly, the object 4 is smoothly carried in a levitated state.

Additionally, the apparatus 19 shown in FIG. 6 may selectively switch between the transducers 26 at the ends of the associated vibrating bodies 20a, 20b that are connected to the associated oscillators 22a, 22b and the transducers 36 at the other ends of the associated vibrating body 20a, 20b that are connected to the associated load circuits 23. Specifically, the direction in which the object 4 is carried can be switched by selecting a connection to the oscillators 22a, 22b or a connection to the load circuits 23.

The horns 5a, 5b are not limited to rectangular parallelepipedic or cylindrical form, but may narrow toward one end as in a frustum.

It is not necessary that the vibrating bodies 2a to 2d be arranged in positions corresponding to the corners of the object 4. The vibrating bodies 2a to 2d may be arranged in positions corresponding to the middles of the edges of the object 4. The number of the vibrating bodies 2a to 2d, 3 is not limited to five. However, the inner vibrating body 3, which is equidistant from the outer vibrating bodies 2a to 2d, may be omitted. The number of the vibrating bodies may be altered according to the dimensions of the object 4, and the positions of the vibrating bodies may also be altered.

It is not necessary that the object 4 be quadrangular. However, the object 4 may be triangular, polygonal, or cylindrical. The outer vibrating bodies 2a to 2d may be horizontal instead of being tilted at an angle of θ with respect to a horizontal plane.

The object 4 is horizontally held. However, the object 4 may be held at an angle by pressures produced by the vibrating bodies 2a to 2d, 3.

The present invention may be used for an object 4 having such a dimension that its edges 4a are situated on imaginary lines extending from the corresponding outer edges 17 of the vibrating bodies 2a to 2d.

The object levitating apparatus according to the present invention is used for an object having a flat bottom surface. However, the apparatus may be used for levitating an object having a V-shaped bottom surface, as disclosed in Japanese Unexamined Patent Publication No. 7-137824.

The vibrating bodies 2a to 2d, 3 are fastened to the respective horns 5a, 5b with the screws. However, adhesive, soldering, or welding may be used to fix the vibrating bodies 2a to 2d, 3 thereto.

It is not necessary that the transducers 6 be the Langevin transducers. Other types of transducers may be used.

Current supplied to each of the oscillators 12a to 12e may be controlled to bring the displaced object 4 back to the predetermined position.

It should be apparent to those skilled in the art that the present invention may be embodied in many other specific forms without departing from the spirit or scope of the invention.

Therefore, the present examples and embodiments are to be considered as illustrative and not restrictive and the invention is not to be limited to the details given herein, but may be modified within the scope and equivalence of the appended claims.

What is claimed is:

1. A method of controlling an object levitating apparatus for levitating an object on a plurality of vibrating bodies with air pressure generated from sound waves produced by the vibrating bodies, wherein each vibrating body is vibrated by a corresponding vibrating apparatus, and each vibrating apparatus has an oscillator and a transducer, the transducer being actuated by the oscillator to vibrate the corresponding vibrating body, the method including:

determining impedance of each transducer; and controlling each oscillator in accordance with the determined impedance to restrict displacement of the levitated object.

2. The method according to claim 1, wherein the step of controlling the oscillator includes controlling at least one of frequency, voltage and electric current of the oscillator.

3. The method according to claim 1, wherein the method further includes detecting displacement of the levitated object based on the determined impedance, wherein each oscillator is controlled to correct the position of the levitated object.

4. The method according to claim 1, wherein the method further includes detecting whether the object is displaced from a predetermined position based on changes of impedance of each transducer, wherein each transducer is controlled to reposition the object when the object is displaced from the predetermined position.

5. A method of controlling an object levitating apparatus for levitating an object on a plurality of vibrating bodies with air pressure generated from sound waves produced by the vibrating bodies, wherein each vibrating body is vibrated by a corresponding vibrating apparatus, and each vibrating apparatus has an oscillator and a transducer, the transducer being actuated by the oscillator to vibrate the corresponding vibrating body, the method including:

determining impedance of each transducer; and controlling the position of each vibrating body in accordance with the determined impedance to restrict displacement of the levitated object.

6. The method according to clam 5, wherein the step of controlling the position of the each vibrating body includes controlling the position of each vibrating body in a vertical direction.

7. The method according to claim 5, wherein the method further includes detecting displacement of the levitated object based on the determined impedance, wherein the position of each vibrating body is controlled to correct the position of the levitated object.

8. The controlling method according to claim 5, wherein the method further includes detecting whether the object is displaced from a predetermined position based on changes of impedance of each transducer, wherein the position of each vibrating body is controlled to reposition the object when the object is displaced from the predetermined position.

9. A levitating apparatus for levitating an object on a plurality of vibrating bodies with air pressure generated from sound waves produced by the vibrating bodies, the apparatus comprising:

a vibrating apparatus for vibrating each vibrating body, wherein each vibrating apparatus has an oscillator and a transducer, the transducer being actuated by the oscillator to vibrate the corresponding vibrating body;

a detector for detecting the impedance of each transducer; and a controller for controlling each oscillator in accordance with the impedance detected by the detector to restrict displacement of the levitated object.

10. The apparatus according to claim 9, wherein the controller controls at least one of frequency, voltage and electric current of each oscillator.

11. The apparatus according to claim 9, wherein each vibrating body produces standing waves.

12. The apparatus according to claim 9, wherein the levitating apparatus is installed on a carrier.

13. The apparatus according to claim 9, wherein at least one of the vibrating bodies is inclined relative to a horizontal plane at a predetermined angle.

14. The apparatus according to claim 9, wherein the object and each vibrating body has a linear edge, respectively, wherein, when the object is levitated, the linear edge of the object is parallel to the linear edge of each vibrating body.

15. The apparatus according to claim 9, wherein the vibrating bodies are parallel and each is elongated and plate-like in shape, and wherein each vibrating body produces traveling waves to move the object in a longitudinal direction of the vibrating body, and the controller controls the oscillators such that the object is restricted from moving in a lateral direction of the vibrating bodies.

16. The apparatus according to claim 15, wherein each transducer is a first transducer connected to a first end of a corresponding vibrating body, wherein the vibrating apparatus further includes a second transducer connected to second ends of the corresponding vibrating bodies, wherein the second transducer is connected to an energy conversion means for reducing the vibration of the second transducer.

17. An apparatus for levitating an object on a plurality of vibrating bodies with air pressure generated by sound waves produced by the vibrating bodies, the apparatus comprising:

a vibrating apparatus for vibrating each vibrating body, wherein each vibrating apparatus has an oscillator and a transducer, the transducer being actuated by the oscillator to vibrate the corresponding vibrating body;

an elevating means for raising or lowering the vibrating bodies;

a detector for detecting the impedance of each transducer; and a controller for controlling the elevating means to change the position of each vibrating body in accordance with the impedance detected by the detector.

* * * * *